(12) United States Patent
Inakura et al.

(10) Patent No.: US 7,871,717 B2
(45) Date of Patent: Jan. 18, 2011

(54) OPTICAL FILM AND METHOD FOR PRODUCING THE SAME

(75) Inventors: Tomoki Inakura, Osaka (JP); Noriaki Otani, Osaka (JP); Sadamu Kuse, Osaka (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 53 days.

(21) Appl. No.: 11/584,588

(22) Filed: Oct. 23, 2006

(65) Prior Publication Data

US 2007/0092730 A1 Apr. 26, 2007

(30) Foreign Application Priority Data

Oct. 24, 2005 (JP) ............................. 2005-308804
Sep. 27, 2006 (JP) ............................. 2006-262836

(51) Int. Cl.
*B32B 9/04* (2006.01)
*B05D 1/36* (2006.01)

(52) U.S. Cl. .................. 428/702; 428/690; 428/336; 427/372.2; 427/385.5; 427/402; 427/418

(58) Field of Classification Search ............... 428/142, 428/213, 220, 421, 690, 336, 702; 427/372.2, 427/385.5, 402, 418; 359/566
See application file for complete search history.

(56) References Cited

U.S. PATENT DOCUMENTS 6,207,263 B1 * 3/2001 Takematsu et al. .......... 428/220
6,214,636 B1 * 4/2001 Sawayama et al. ............ 438/57
6,723,423 B1   4/2004 Kaneko et al.
2002/0044356 A1 * 4/2002 Arakawa et al. ............ 359/566
2002/0127408 A1   9/2002 Nishida et al.
2003/0049456 A1 * 3/2003 Kawasato et al. ........... 428/421
2005/0147768 A1 * 7/2005 Hashimoto ................. 428/1.6

(Continued)

FOREIGN PATENT DOCUMENTS

JP       07-287102       * 10/1995

(Continued)

OTHER PUBLICATIONS

Murakami et al., JP 2001-183528, JPO English Machine translation obtained Mar. 25, 2009.*

(Continued)

*Primary Examiner*—Jennifer C McNeil
*Assistant Examiner*—Lauren Robinson
(74) *Attorney, Agent, or Firm*—Birch, Stewart, Kolasch & Birch, LLP (57) ABSTRACT

An optical film according to the present invention comprises a transparent base, and an anti-reflection layer that is disposed on one main face of the transparent base. The anti-reflection layer includes a hard coating layer, and a low refractive index layer that is disposed on the hard coating layer in this order from the side of the transparent base. The hard coating layer is formed using a resin containing an ionizing radiation setting resin. The hard coating layer contains a conductive metal oxide in an amount of at least 5 wt % and at most 30 wt % with respect to the total weight of the hard coating layer. The hard coating layer is formed using a coating solution containing water in an amount of at least 0.05 wt % and at most 5.0 wt %.

21 Claims, 1 Drawing Sheet

U.S. PATENT DOCUMENTS

2006/0029794 A1* 2/2006 Mikami et al. ............... 428/328

FOREIGN PATENT DOCUMENTS

| JP | 2000-233467 | A | 8/2000 |
|---|---|---|---|
| JP | 2001-183528 | * | 7/2001 |
| JP | 2001-183528 | A | 7/2001 |
| JP | 2002-200690 | A | 7/2002 |
| JP | 2003-306561 | A | 10/2003 |

OTHER PUBLICATIONS

Nakamura 07-287102 JPO English Machine translation obtained Mar. 25, 2009.*

English language translation of JP-2003-306561-A (Oct. 31, 2003).

* cited by examiner

FIG. 1

OPTICAL FILM AND METHOD FOR PRODUCING THE SAME

BACKGROUND OF THE INVENTION

1. Field of the Invention

The present invention relates to an optical film having an anti-static function and an anti-reflection function, and a method for producing the same.

2. Description of the Related Art

High-definition large-screen displays, typified by plasma display panels (PDPs) and the like, have been rapidly developed. It is necessary to dispose an anti-reflection layer having an anti-reflection function on the surface of displays, in order to prevent outside light from being reflected on the screen thereof. Furthermore, displays are required to have an anti-static function in order to prevent dust, filth, or the like from being attached to the screen surface due to static electricity. Thus, in conventional displays, an optical film having an anti-reflection function and an anti-static function is disposed on the front face of the screen.

This conventional optical film is formed by disposing an anti-reflection layer on a transparent base, wherein the anti-reflection layer often has a three-layer structure in which a hard coating layer, a high refractive index layer with a thickness of 1 µm or less, and a low refractive index layer are laminated in this order from the side of the transparent base. Furthermore, an anti-static function usually is provided by adding an anti-static material to the high refractive index layer (see JP 2002-200690A, for example).

As the anti-static material, a conductive metal oxide often is used in conventional examples. However, many conductive metal oxides that absorb light with a specific wavelength are colored, and thus if the thickness of an anti-static layer to which these conductive metal oxides have been added is more than 1 µm, or if the amount thereof added is excessive, then there is a problem in that the total light transmission of the optical film is reduced. Furthermore, there also is a problem in that light is prevented from traveling by conductive metal oxide particles, and thus the internal scattering of light increases the haze. In conventional examples, an anti-static material is added to a high refractive index layer with a thickness of 1 µm or less as described above, and thus the total light transmission is reduced to a lesser extent and the haze increases to a lesser extent.

On the other hand, in recent years, it has been proposed that an anti-reflection layer have a two-layer structure comprising a hard coating layer and a low refractive index layer, without a high refractive index layer, in order to reduce the number of production processes (see JP 2000-233467A, for example).

However, according to JP 2000-233467A, a considerable amount of fine particles of a conductive metal oxide are added as an anti-static material to a conductive transparent layer with a thickness of several µm that is disposed under the low refractive index layer, and thus the total light transmission is less than 91% even at the maximum, and the haze is 1.0% even at the minimum. In other words, the transmittance is not sufficient.

On the other hand, it also has been proposed to reduce the amount of the conductive metal oxide added inside the hard coating layer (see JP 2003-306561A, for example).

However, JP 2003-306561A does not describe an anti-reflection layer at all, and the total light transmission is less than 91% even at the maximum, and the haze is 0.9% even at the minimum, that is, the transmittance is not sufficient as well as in JP 2000-233467A. Furthermore, JP 2003-306561A discloses a method for producing an anti-static hard coating film, comprising a step of performing humidification in an atmosphere with a relative humidity of 35 to 70%, but the relative humidity changes depending on the temperature, and thus the production conditions cannot be constant, so that there is a problem in that the characteristics of produced films are not constant.

SUMMARY OF THE INVENTION

An optical film of the present invention includes: a transparent base; and an anti-reflection layer that is disposed on one main face of the transparent base, wherein the anti-reflection layer includes a hard coating layer, and a low refractive index layer that is disposed on the hard coating layer in this order from the side of the transparent base, the hard coating layer is formed using a resin containing an ionizing radiation setting resin, the hard coating layer contains a conductive metal oxide in an amount of 5 wt % or more and 30 wt % or less with respect to a total weight of the hard coating layer, and the hard coating layer is formed using a coating solution containing water in an amount of 0.05 wt % or more and 5.0 wt % or less.

Furthermore, a first method for producing an optical film according to the present invention is directed to a method for producing the above-described optical film according to the present invention, comprising: preparing a hard coating layer-coating solution containing an ionizing radiation setting resin, a conductive metal oxide in an amount of 5 wt % or more and 30 wt % or less with respect to a total solid content of the coating solution, and water in an amount of 0.05 wt % or more and 5.0 wt % or less with respect to the coating solution; applying and drying the hard coating layer-coating solution on a surface of a transparent base; and forming a hard coating layer on the surface of the transparent base by curing the hard coating layer-coating solution.

Furthermore, a second method for producing an optical film according to the present invention is directed to a method for producing the above-described optical film according to the present invention, comprising: preparing a hard coating layer-coating solution containing an ionizing radiation setting resin, and a conductive metal oxide in an amount of 5 wt % or more and 30 wt % or less with respect to a total solid content of the coating solution, in an atmosphere with an absolute humidity of 10 $g/m^3$ or more and 16 $g/m^3$ or less; applying and drying the hard coating layer-coating solution on a surface of a transparent base; and forming a hard coating layer on the surface of the transparent base by curing the hard coating layer-coating solution.

According to the present invention, it is possible to provide an optical film provided with an anti-reflection layer in which the transmittance and the anti-static property are high and the scratch resistance is high.

DESCRIPTION OF THE PREFERRED EMBODIMENTS

An optical film according to the present invention comprises a transparent base, and an anti-reflection layer that is disposed on one main face of the transparent base. Furthermore, the anti-reflection layer has a two-layer structure in which a hard coating layer, and a low refractive index layer that is disposed on the hard coating layer are laminated from the side of the transparent base. With the two-layer structure, it is possible to reduce the number of production processes of the optical film.

The hard coating layer is formed using a resin containing an ionizing radiation setting resin. Accordingly, it is possible to form the hard coating layer with a smaller number of process steps.

Furthermore, the hard coating layer contains a conductive metal oxide in an amount of 5 wt % or more and 30 wt % or less, preferably 5 wt % or more and 20 wt % or less, and more preferably 5 wt % or more and 15 wt % or less, with respect to the total weight of the hard coating layer. If the conductive metal oxide is less than 5 wt %, then the anti-static function is lowered. If the conductive metal oxide is more than 30 wt %, then the total light transmission of the optical film is reduced.

Also, the hard coating layer is formed using a coating solution containing water in an amount of 0.05 wt % or more and 5.0 wt % or less, and preferably 0.3 wt % or more and 2.0 wt % or less. Accordingly, the conductivity of the hard coating layer is improved, and thus the anti-static property is not lowered, even if the amount of the conductive metal oxide added is reduced.

Furthermore, the refractive index of the low refractive index layer preferably is set to be lower than that of the hard coating layer. Accordingly, even if the anti-reflection layer has a two-layer structure, it is possible to provide a high anti-reflection function.

Furthermore, the surface electrical resistance (hereinafter, simply referred to as surface resistance) on the side of the anti-reflection layer preferably is $1 \times 10^{13}$ Ω/square or less, and more preferably $5 \times 10^{12}$ Ω/square or less. The reason for this is that if the surface resistance is more than $1 \times 10^{13}$ Ω/square, then it is not preferable because dust, filth, or the like easily are attached. It is preferable that the surface resistance is as low as possible. However, in an actual state, if the amount of the conductive metal oxide added is increased in order to lower the surface resistance, then coloring is increased, and thus the total light transmission is reduced, the haze is increased, and furthermore, the hardness of the coating is reduced, and thus the scratch resistance is lowered. Thus, the lower limit value of the surface resistance cannot be lower than approximately $1 \times 10^{8}$ Ω/square.

When the anti-reflection layer is disposed on the transparent base, it is possible to realize a configuration in which the total light transmission of the optical film consisting of the transparent base and the anti-reflection layer is 91% or more, and the total light transmission of the optical film is higher than that of the transparent base alone. The reason for this is that when the anti-reflection layer is provided, the amount of light that is incident on the entire optical film is increased.

Furthermore, the haze of the optical film preferably is 0.8% or less, and more preferably 0.3% or less. Accordingly, it is possible to provide an optical film with a low light scattering. Herein, the haze refers to a haze value that is described in Japanese Industrial Standards (JIS) K 7105. It is preferable that the haze is as low as possible, but due to the influence of the conductive metal oxide added to the hard coating layer, the lower limit value of the haze cannot be lower than approximately 0.2%.

It is preferable that a primer layer is additionally disposed between the transparent base and the anti-reflection layer. Accordingly, it is possible to improve the adhesive strength between the transparent base and the anti-reflection layer.

It is preferable that a near infrared absorption layer is additionally disposed on the other main face of the transparent base. Accordingly, when the optical film is disposed on the surface of a PDP, unnecessary near infrared rays discharged during plasma discharge are blocked, and thus do not adversely affect equipment using electronic components arranged nearby, and in particular, the problem is solved that remote controllers of a television, an air conditioner, and the like malfunction.

It is preferable that a primer layer is additionally disposed between the transparent base and the near infrared absorption layer. Accordingly, it is possible to improve the adhesive strength between the transparent base and the near infrared absorption layer.

Next, methods for producing an optical film according to the present invention are described. A first method for producing an optical film according to the present invention comprises preparing a hard coating layer-coating solution containing an ionizing radiation setting resin, a conductive metal oxide in an amount of 5 wt % or more and 30 wt % or less with respect to a total solid content of the coating solution, and water in an amount of 0.05 wt % or more and 5.0 wt % or less with respect to the coating solution; applying and drying the hard coating layer-coating solution on a surface of a transparent base; and forming a hard coating layer on the surface of the transparent base by curing the hard coating layer-coating solution.

Furthermore, a second method for producing an optical film according to the present invention comprises preparing a hard coating layer-coating solution containing an ionizing radiation setting resin, and a conductive metal oxide in an amount of 5 wt % or more and 30 wt % or less with respect to a total solid content of the coating solution, in an atmosphere with an absolute humidity of 10 g/m$^3$ or more and 16 g/m$^3$ or less; applying and drying the hard coating layer-coating solution on a surface of a transparent base; and forming a hard coating layer on the surface of the transparent base by curing the hard coating layer-coating solution.

When a conductive metal oxide in an amount of 5 wt % or more and 30 wt % or less, preferably 5 wt % or more and 20 wt % or less, and more preferably 5 wt % or more and 15 wt % or less, with respect to the total solid content of the hard coating layer-coating solution is added to the coating solution, it is possible to provide the optical film with an anti-static function without reducing the total light transmission of the optical film.

Furthermore, when water in an amount of 0.05 wt % or more and 5.0 wt % or less, and preferably 0.3 wt % or more and 2.0 wt % or less is added to the hard coating layer-coating solution, it is possible to provide an optical film with a high anti-static property, in which the conductivity of the hard coating layer is not lowered even if the amount of the conductive metal oxide added is reduced.

Also, when the hard coating layer-coating solution is prepared in an atmosphere with an absolute humidity of 10 g/m$^3$ or more and 16 g/m$^3$ or less, and preferably 13 g/m$^3$ or more and 16 g/m$^3$ or less, water can be contained in the hard coating layer-coating solution even if water is not added to the coating solution, and thus it is possible to provide an optical film with a high anti-static property, in which the conductivity of the hard coating layer is not lowered even if the amount of the conductive metal oxide added is reduced. The absolute humidity refers to the water vapor content contained in air with a volume of 1 m$^3$, that is expressed in the unit of gram, and is calculated based on the temperature and the relative humidity in the present invention.

Furthermore, in the methods for producing an optical film according to the present invention, it is preferable that the hard coating layer-coating solution is applied and dried on the surface of the transparent base in an atmosphere with an absolute humidity of 10 g/m$^3$ or more and 16 g/m$^3$ or less.

Figure 1:
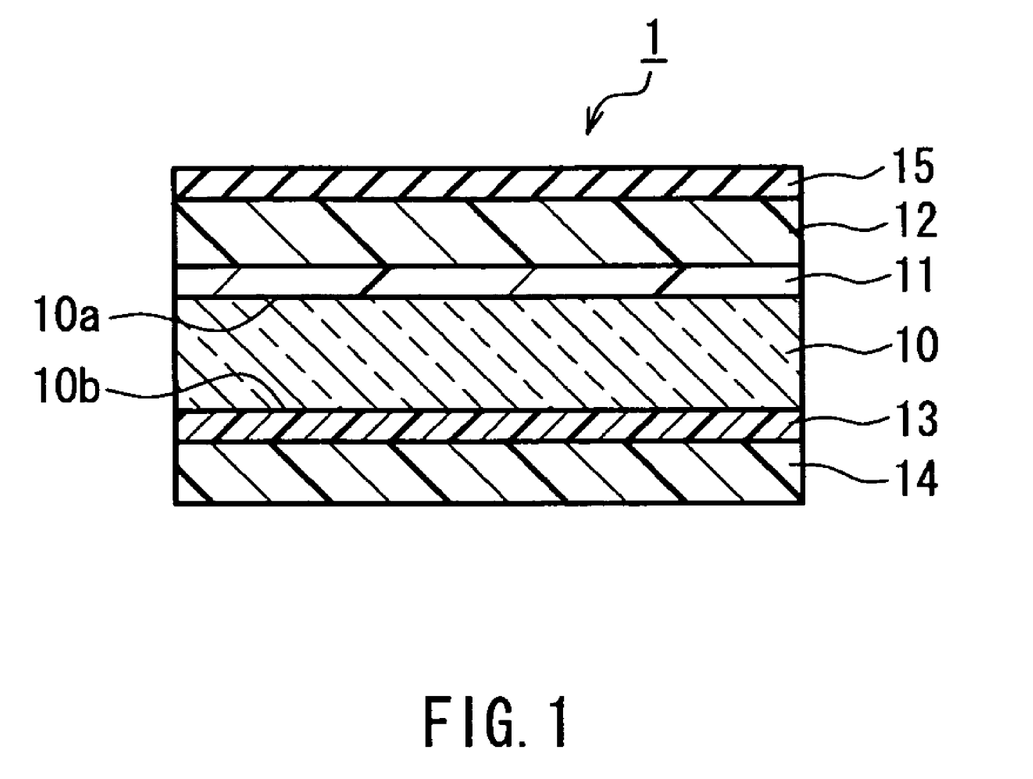
FIG. 1 is a cross-sectional view showing one example of an optical film according to the present invention.

Hereinafter, the present invention will be described with reference to the drawing. FIG. 1 is a cross-sectional view showing one example of an optical film according to the present invention. In FIG. 1, an optical film 1 is provided with a transparent base 10, a hard coating layer 12 that is disposed via a first primer layer 11 on one main face 10a of the transparent base 10, and a near infrared absorption layer 14 that is disposed via a second primer layer 13 on the other main face 10b of the transparent base 10. Furthermore, a low refractive index layer 15 is provided on the hard coating layer 12. The hard coating layer 12 and the low refractive index layer 15 constitute an anti-reflection layer.

The hard coating layer 12 is formed using a resin containing an ionizing radiation setting resin. The hard coating layer 12 contains a conductive metal oxide in an amount of 5 wt % or more and 30 wt % or less with respect to the total weight of the hard coating layer 12. Furthermore, the refractive index of the low refractive index layer 15 is set to be lower than that of the hard coating layer 12.

There is no specific limitation regarding a material constituting the transparent base 10, and it is possible to use a film or a sheet obtained by processing a resin such as a saturated polyester resin, a polycarbonate resin, a polyacrylic acid ester resin, an alicyclic polyolefin resin, a polystyrene resin, a polyvinyl chloride resin, a polyvinyl acetate resin, and a triacetyl cellulose resin, for example. The thickness of the transparent base 10 usually is approximately 10 to 500 μm. It should be noted that an additive such as an antioxidant, a flame retardant, an ultraviolet absorber, and a smoothing agent may be added to the resin. Furthermore, the total light transmission of the transparent base 10 preferably is 80% or more, and more preferably 90% or more. Furthermore, the haze of the transparent base 10 preferably is 1.5% or less, and more preferably 0.8% or less.

There is no specific limitation regarding a material constituting the first primer layer 11 and the second primer layer 13, and it is possible to use a polyester resin, a polyurethane resin, and an acrylic resin, for example. These resins may be used alone or in combination as a polymer blend. It is more preferable to copolymerize these resins with a component having a hydrophilic group such as a carboxyl group and a hydroxyl group, because the adhesiveness between the anti-reflection layer (the hard coating layer 12, the low refractive index layer 15) and the transparent base 10 further is improved.

The primer layers may contain at least one type of particles selected from the group consisting of inorganic particles and organic particles, in order to improve the sliding property, the curling property, the abrasion resistance, and the like of the transparent base, or to adjust the refractive index. As these particles, it is possible to use inorganic particles of, for example, calcium carbonate, calcium phosphate, silica, titanium dioxide, alumina, barium sulphate, calcium fluoride, zeolite, and molybdenum sulfide, and organic particles of, for example, crosslinked polymer particles, calcium oxalate. Among these particles, silica particles are preferable because they tend to provide a high transparency. The average particle size of the particles usually is 0.005 to 1.0 μm, preferably 0.005 to 0.5 μm, and more preferably 0.005 to 0.1 μm. If the average particle size is more than 1.0 μm, then the surface of the primer layers becomes rough, and the transparency of the film tends to be lowered. Furthermore, the content of the particles in the primer layers usually is 60 wt % or less, preferably 50 wt % or less, and more preferably 40 wt % or less. If the content of the particles is more than 60 wt %, then the transparency of the film may be deteriorated.

The thickness of the primer layers preferably is 20 nm or more and less than 1 μm, and more preferably 50 nm or more and less than 0.7 μm. If the thickness of the primer layers is less than 20 nm, then an effect of improving the adhesiveness becomes small. If the thickness is 1 μm or more, then an effect of improving the adhesiveness is saturated, and moreover, such a primer layer is economically disadvantageous, and also makes the optical film thicker than necessary, and thus it is not preferable.

Furthermore, it is possible to reduce interference fringes caused by a difference in the refractive index between the transparent base 10 and the hard coating layer 12, by setting the refractive index and the thickness of the first primer layer 11 as appropriate. It is preferable to satisfy $n_H \leq n_P \leq n_B$ or $n_H \geq n_P \geq n_B$, and $|n_P - n_B| \leq 0.1$, taking the refractive index of the transparent base 10 as $n_B$, the refractive index of the first primer layer 11 as $n_P$, and the refractive index of the hard coating layer 12 as $n_H$, because the reflection spectrum of the optical film 1 is improved.

The primer layers can be formed by producing a coating solution containing, for example, the resin, the inorganic particles, and the organic particles, and applying this coating solution to the transparent base 10. There is no specific limitation regarding an application method, and examples thereof include a reverse roll coating method, a gravure coating method, a kiss coating method, a roll brushing method, a spray coating method, an airknife coating method, a pipe doctor method, a dipping method, and a curtain coating method. These methods can be used alone or in combination.

There is no specific limitation regarding the ionizing radiation setting resin used for forming the hard coating layer 12, and it is possible to use a monomer, a prepolymer, and a polymer having, for example, a vinyl group, a (meth)acryloyl group, an epoxy group, or an oxetanyl group. These materials can be used alone or in combination of two or more types.

As the conductive metal oxide contained in the hard coating layer 12, it is possible to use an antimony-tin oxide (ATO), an indium-tin oxide (ITO), a phosphorus-tin oxide (PTO), a zinc oxide (ZnO), a stannic oxide ($SnO_2$, a zinc antimonate ($ZnSb_2O_6$), and an antimony pentoxide ($Sb_2O_5$), for example. These materials can be used alone or in combination of two or more types. The conductive metal oxide is used preferably in the form of fine particles, and the primary particle size thereof preferably is 100 nm or less, more preferably 50 nm or less, and even more preferably 20 nm or less. The reason for this is that if the primary particle size is within this range, then the dispersibility in the ionizing radiation setting resin is improved. Furthermore, if the dispersibility of the conductive metal oxide is improved, then the haze of the coating is reduced. There is no specific limitation regarding the lower limit value of the primary particle size of the conductive metal oxide. In the present invention, the particle size refers to a value obtained by performing a measurement using a laser diffraction scattering method.

The fine particles of the conductive metal oxide are available easily as organosol dispersed in an organic solvent.

If irradiation of ultraviolet rays is performed when curing the ionizing radiation setting resin, a photoinitiator is added to a hard coating layer-coating solution. As the photoinitiator, it is possible to use acetophenones, benzophenones, ketals, anthraquinones, thioxanthones, azo compounds, peroxides, 2,3-dialkyldione compounds, disulphide compounds, thiuram compounds, and fluoro amine compounds, for example. These materials can be used alone or in combination of two or more types.

Furthermore, the hard coating layer-coating solution may contain a resin component other than the ionizing radiation setting resin, and an additive such as a polymerization-inhibitor, an antioxidant, a dispersing agent, a surface-active agent, a photostabilizer, and a leveling agent may be added to the hard coating layer-coating solution. Furthermore, any amount of solvent may be added to the hard coating layer-coating solution as long as the coating solution is dried after being applied using a wet coating method.

The hard coating layer-coating solution contains water in an amount of 0.05 wt % or more and 5.0 wt % or less with respect to the total weight of the coating solution. The reason for this is that when water within this range is present in the hard coating layer-coating solution, even if the amount of the conductive metal oxide added is reduced, the conductivity of the hard coating layer 12 is not reduced, and thus an optical film with a high anti-static property can be provided. Furthermore, methods for adding water within the range to the coating solution may include agitating the coating solution in an environment with an absolute humidity of 10 g/m$^3$ or more and 16 g/m$^3$ or less for a predetermined time, in addition to directly adding water to the coating solution.

There is no specific limitation regarding a method for forming the hard coating layer 12 on the transparent base 10, and it is possible to form the hard coating layer 12 by applying, to the transparent base 10, a coating solution in which the materials described above are dispersed in an organic solvent, for example. Also, there is no specific limitation regarding an application method, and it is possible to use coating methods such as roll coating, die coating, airknife coating, blade coating, spin-coating, reverse coating, and gravure coating, or printing methods such as gravure printing, screen printing, offset printing, and inkjet printing, for example. The hard coating layer-coating solution that has been applied using these methods is dried, and then cured by being irradiated with ionizing radiation such as ultraviolet rays, thereby forming the hard coating layer 12.

Furthermore, the application step and the drying step of the hard coating layer-coating solution are performed preferably in an environment with an absolute humidity of 10 g/m$^3$ or more and 16 g/m$^3$ or less.

The surface hardness of the hard coating layer 12 preferably is H or more, and more preferably 2 H or more, based on the evaluation according to the pencil hardness test prescribed in JIS K 5600. Furthermore, the thickness of the hard coating layer 12 preferably is 1 to 7 µm, and more preferably 2 to 5 µm. If the thickness is less than 1 µm, then it is difficult to maintain the hardness thereof. If the thickness is more than 7 µm, a crack or curl (warp of the film) appears, or the total light transmission of the optical film 1 is reduced.

In order to realize the optical film 1 in which the total light transmission of a portion consisting of the transparent base 10 and the anti-reflection layer (the hard coating layer 12, the low refractive index layer 15) is 91% or more, the total light transmission of this portion is higher than that of the transparent base 10 alone, the haze is 0.8% or less, and the surface resistance of the optical film 1 on the side of the anti-reflection layer is 1×10$^{13}$ Ω/square or less, it is necessary that the amount of the conductive metal oxide added to the hard coating layer 12 is as small as possible, the total light transmission of the portion of the optical film 1 is as high as possible, and the conductivity of the hard coating layer 12 is exerted to the extent possible, and thus it is preferable to adopt an appropriate combination of the following conditions (1) to (8).

(1) The thickness of the transparent base 10 is 10 to 500 µm. The total light transmission thereof is 80% or more, and more preferably 90% or more. The haze thereof is 1.5% or less, and more preferably 0.8% or less.

(2) The thickness of the hard coating layer 12 is 1 to 7 µm, and more preferably 2 to 5 µm.

(3) The primary particle size of fine particles of the conductive metal oxide contained in the hard coating layer 12 is 100 nm or less, more preferably 50 nm or less, and even more preferably 20 nm or less.

(4) The amount of fine particles of the conductive metal oxide present in the hard coating layer 12 is 5 wt % or more and 30 wt % or less, preferably 5 wt % or more and 20 wt % or less, and more preferably 5 wt % or more and 15 wt % or less, with respect to the total weight of the hard coating layer 12.

(5) The hard coating layer-coating solution contains 0.05 to 5.0 wt % of water with respect to the total weight of the coating solution.

(6) The hard coating layer-coating solution is prepared in an environment with an absolute humidity of 10 to 16 g/m$^3$.

(7) The application step and the drying step of the hard coating layer-coating solution are performed in an environment with an absolute humidity of 10 to 16 g/m$^3$.

(8) The hard coating layer-coating solution contains an organic solvent (hygroscopic solvent) with a solubility parameter of 9.5 or more, in an amount of 0.05 to 80 wt % with respect to the total weight of the coating solution.

Next, the low refractive index layer 15 is described. With respect to the low refractive index layer 15 that is disposed on the hard coating layer 12, it is preferable to set the thickness ($d_L$) thereof such that the following equation is satisfied, because the reflectance is lowered. Herein, the wavelength (often set to 550 nm) of light for which the visibility of human eyes is high is taken as λ, and the refractive index of the low refractive index layer 15 is taken as $n_L$.

$$d_L = \lambda/(4n_L)$$

Furthermore, the anti-reflection property is improved as a difference in the refractive index between the low refractive index layer 15 and the hard coating layer 12 is larger. In order to improve the reflectance, the refractive index of the low refractive index layer 15 is set to, for example, 1.5 or less, and more preferably 1.48 or less. Also, the low refractive index layer 15 preferably is strong and has an antifouling property because it is positioned at the outermost face of the optical film 1.

A low refractive index layer-coating solution for forming the low refractive index layer 15 preferably contains a material having a refractive index that is lower than that of the hard coating layer 12, and may contain inorganic fine particles with a low refractive index of, for example, silica having spaces inside the particles or magnesium fluoride, a binder, and a solvent, for example. Furthermore, the low refractive index layer-coating solution may contain photoinitiator and various additives, if necessary.

As the binder, it is possible to use any one of organic binders and inorganic binders. As the organic binder, it is possible to use an ionizing radiation setting resin made of a monomer, a prepolymer, or a polymer having, for example, a vinyl group, a (meth)acryloyl group, an epoxy group, or an oxetanyl group. Furthermore, as the inorganic binder, it is possible to use a heat setting binder such as silica sol. Examples of the silica sol include silica sol using silicon alkoxide and acid catalyst or alkali catalyst as starting materials. As the silicon alkoxide, for example, tetramethoxysilane or tetraethoxysilane is used.

If irradiation of ultraviolet rays is performed when curing the ionizing radiation setting resin, a photoinitiator similar to that used for the hard coating layer-coating solution may be added.

Furthermore, as the additive, it is possible to use a polymerization-inhibitor, an antioxidant, a dispersing agent, a surface-active agent, a photostabilizer, and a leveling agent, for example. Furthermore, any amount of solvent may be added to the low refractive index layer-coating solution as long as the coating solution is dried after being applied using a wet coating method.

There is no specific limitation regarding a method for forming the low refractive index layer 15 on the hard coating layer 12, and it is possible to form the low refractive index layer 15 by applying, to the hard coating layer 12, a coating solution in which the materials described above are dispersed in an organic solvent, as in the case of the hard coating layer 12, for example.

Next, the near infrared absorption layer 14 is described. The near infrared absorption layer 14 may not be present depending on characteristics required for the optical film, but if the near infrared absorption layer 14 is present, then when the optical film 1 is disposed on the surface of a PDP, unnecessary near infrared rays discharged during plasma discharge are blocked, and thus do not adversely affect equipment using electronic components arranged nearby, and in particular, the problem is solved that remote controllers of a television, an air conditioner, and the like malfunction. Since the anti-reflection layer described above is provided on the optical film 1, even if the near infrared absorption layer 14 is provided, the total light transmission of the optical film is high, and thus the degree of freedom in designing the near infrared absorption layer 14 increases. Accordingly, it is possible to design preferable optical films for displays.

There is no specific limitation regarding a material constituting the near infrared absorption layer 14 as long as it is a transparent material absorbing near infrared rays, but a resin usually is used in which a compound absorbing near infrared rays is dispersed.

The compound absorbing near infrared rays preferably is a compound having the maximum absorption wavelength in a wavelength region of 850 to 1100 nm. If the near infrared absorption layer 14 contains this compound, then it is possible to reduce the transmission of near infrared rays in a wavelength region of 850 to 1100 nm without significantly reducing the transmission of visible light with a wavelength of 400 to 850 nm. Accordingly, the optical film 1 preferably can be used as a near infrared absorption filter for a PDP, for example.

As the compound having the maximum absorption wavelength in a wavelength region of 850 to 1100 nm, it is possible to use azo-based, azine-based, anthraquinone-based, indigoid-based, oxazine-based, squarylium-based, stilbene-based, triphenylmethane-based, naphthoquinone-based, diimonium-based, phthalocyanine-based, cyanine-based, and polymethine-based organic dyes, for example.

As the resin in which the compound absorbing near infrared rays is to be dispersed, it is possible to use a polyester resin, an acrylic resin, a polyurethane resin, a polyvinyl chloride resin, an epoxy resin, a polyvinyl acetate resin, a polystyrene resin, a cellulose resin, and a polybutyral resin, for example. These resins may be used in combination of two or more types as a polymer blend.

There is no specific limitation regarding a method for forming the near infrared absorption layer 14 on the transparent base 10, and it is possible to form the near infrared absorption layer 14 by applying a coating solution containing the materials described above to the transparent base 10, as in the case of the hard coating layer 12, for example. Also, there is no specific limitation regarding an application method, and it is possible to use coating methods such as roll coating, die coating, airknife coating, blade coating, spin-coating, reverse coating, and gravure coating, or printing methods such as gravure printing, screen printing, offset printing, and inkjet printing, for example. The thickness of the near infrared absorption layer 14 preferably is 1 to 10 μm, and more preferably 2 to 7 μm. If the thickness is less than 1 μm, then it is difficult to absorb near infrared rays. If the thickness is more than 10 μm, then a crack or curl (warp of the film) appears.

A compound cutting a neon line spectrum (orange) of a PDP can be added to the near infrared absorption layer 14 as appropriate. Accordingly, red can be developed more vividly on a PDP. As the compound cutting a neon line spectrum, it is possible to use organic dyes having the maximum absorption wavelength in a wavelength region of 580 to 620 nm, and examples thereof include cyanine-based, squarylium-based, diphenylmethane-based, triphenylmethane-based, oxazine-based, azine-based, thiopyrylium-based, azo-based, azo metal complex salt-based, azaporphyrin-based, bisazo-based, anthraquinone-based, and phthalocyanine-based organic dyes.

The thickness of the near infrared absorption layer 14, the type of materials thereof, the content ratio thereof, and the like may be determined as appropriate so that the spectral transmission factor of the optical film 1 is 20% or less throughout the range in which the wavelength is 850 to 1100 nm.

Hereinafter, the present invention is described based on examples, but the present invention is not limited to the following examples. It should be noted that "parts" in Examples and Comparative Examples refers to parts by weight, and "average particle size" refers to the number average particle size.

Example 1

An optical film for evaluation having a similar structure as that of the optical film shown in FIG. 1 was manufactured as follows.

<Preparation of Transparent Base>

As a transparent base, a polyethylene terephthalate (PET) film (total light transmission: 92.4%) having a property of cutting ultraviolet rays and a thickness of 100 μm, in which a first primer layer made of a polyester resin containing silica fine particles was formed on one main face, and a second primer layer made of an acrylic resin containing silica was formed on the other main face, was prepared as a primer layer-attached transparent base.

<Manufacture of Hard Coating Layer-Coating Solution>

A hard coating layer-coating solution was manufactured by sufficiently mixing and agitating the following materials in an environment with an absolute humidity of 11 g/m$^3$. The water content of the manufactured hard coating layer-coating solution was 0.45 wt % based on a measurement following the Karl Fischer method.

(1) Zinc antimonate fine particles (conductive metal oxide produced by Nissan Chemical Industries, Ltd., isopropyl alcohol sol with a solid content of 20 wt %, primary particle size: 20 nm): 25 parts (solid content: 5 parts)
(2) Pentaerythritol triacrylate: 7 parts (solid content)
(3) Dipentaerythritol hexaacrylate: 7 parts (solid content)
(4) Photoinitiator "IRGACURE (registered trademark) 184" (produced by Ciba Specialty Chemicals): 1 part (solid content)
(5) Isopropyl alcohol (solubility parameter: 11.5): 60 parts Accordingly, the ratio of the conductive metal oxide with respect to the total solid content of the coating solution was 25 wt %.

Next, using a Micro Gravure coater (produced by Yasui Seiki), the hard coating layer-coating solution was applied to the first primer layer of the primer layer-attached transparent base in an environment with an absolute humidity of 10 g/m$^3$, and then dried. Subsequently, the dried coating was irradiated with ultraviolet rays in a dose of 100 mJ/cm$^2$, and thus the coating was cured, thereby forming a hard coating layer with a thickness of 3 μm.

<Manufacture of Low-Refractive Index Layer-Coating Solution>

A low refractive index layer-coating solution was manufactured by mixing and agitating the following materials.
(1) Hollow silica fine particles (produced by Catalysts & Chemicals Industries Co., Ltd.): 60 parts
(2) Pentaerythritol triacrylate: 20 parts
(3) Dipentaerythritol hexaacrylate: 20 parts
(4) Photoinitiator "IRGACURE (registered trademark) 907" (produced by Ciba Specialty Chemicals): 4 parts
(5) Methacryl modified silicone "X-22-164B" (produced by Shin-Etsu Silicones): 1 part
(6) Isopropyl alcohol: 2000 parts Next, using the Micro Gravure coater, the low refractive index layer-coating solution was applied to the hard coating layer, and then dried. Subsequently, the dried coating was irradiated with ultraviolet rays in a dose of 300 mJ/cm$^2$, and thus the coating was cured, thereby forming a low refractive index layer with a thickness of 107 nm.

<Manufacture of Near Infrared Absorption Layer-Coating Solution>

A near infrared absorption layer-coating solution was manufactured by mixing and agitating the following materials.
(1) Acrylic resin "Foret GS-1000" (produced by Soken Chemical & Engineering Co., Ltd.): 100 parts
(2) Aromatic diimonium dye "CIR-1085" (produced by Japan Carlit Co., Ltd.): 6 parts
(3) Near infrared absorbing compound containing a cyanin moiety and a dithiole metal complex moiety "SD50-E04N" (produced by Sumitomo Seika Chemicals Company Limited, maximum absorption wavelength: 877 nm): 1 part
(4) Near infrared absorbing compound containing a cyanin moiety and a dithiole metal complex moiety "SD50-E05N" (produced by Sumitomo Seika Chemicals Company Limited, maximum absorption wavelength: 833 nm): 1 part
(5) Methyl ethyl ketone: 125 parts
(6) Toluene: 460 parts Next, using the Micro Gravure coater, the near infrared absorption layer-coating solution was applied to the second primer layer of the primer layer-attached transparent base, and thus a near infrared absorption layer was formed so that the thickness thereof was 4 μm. Thus, an optical film for evaluation was manufactured.

Example 2

Preparation of Transparent Base

A primer layer-attached transparent base was prepared as in Example 1.

<Manufacture of Hard Coating Layer-Coating Solution>

A hard coating layer-coating solution was manufactured by sufficiently mixing and agitating the following materials in an environment with an absolute humidity of 11 g/m$^3$. The water content of the manufactured hard coating layer-coating solution was 0.51 wt % based on a measurement performed as in Example 1.

(1) ATO fine particles (conductive metal oxide produced by Catalysts & Chemicals Industries Co., Ltd., isopropyl alcohol sol with a solid content of 20 wt %, primary particle size: 20 nm): 17.5 parts (solid content: 3.5 parts)
(2) Pentaerythritol triacrylate: 7.5 parts (solid content)
(3) Dipentaerythritol hexaacrylate: 8 parts (solid content)
(4) Photoinitiator "IRGACURE (registered trademark) 184" (produced by Ciba Specialty Chemicals): 1 part (solid content)
(5) Isopropyl alcohol (solubility parameter: 11.5): 66 parts Accordingly, the ratio of the conductive metal oxide with respect to the total solid content of the coating solution was 17.5 wt %.

Next, using the Micro Gravure coater (produced by Yasui Seiki), the hard coating layer-coating solution was applied to the first primer layer of the primer layer-attached transparent base in an environment with an absolute humidity of 15 g/m$^3$, and then dried. Subsequently, the dried coating was irradiated with ultraviolet rays in a dose of 100 mJ/cm$^2$, and thus the coating was cured, thereby forming a hard coating layer with a thickness of 3 μm. Subsequently, as in Example 1, a low refractive index layer and a near infrared absorption layer were formed, and thus an optical film for evaluation was manufactured.

Example 3

Preparation of Transparent Base

A primer layer-attached transparent base was prepared as in Example 1.

<Manufacture of Hard Coating Layer-Coating solution>

A hard coating layer-coating solution was manufactured by sufficiently mixing and agitating the following materials in an environment with an absolute humidity of 13 g/m$^3$. The water content of the manufactured hard coating layer-coating solution was 0.65 wt % based on a measurement performed as in Example 1.

(1) Zinc antimonate fine particles (conductive metal oxide produced by Nissan Chemical Industries, Ltd., isopropyl alcohol sol with a solid content of 20 wt %, primary particle size: 20 nm): 15 parts (solid content: 3 parts)
(2) Pentaerythritol triacrylate: 7 parts (solid content)
(3) Dipentaerythritol hexaacrylate: 9 parts (solid content)
(4) Photoinitiator "IRGACURE (registered trademark) 907" (produced by Ciba Specialty Chemicals): 1 part (solid content)
(5) Methyl ethyl ketone (solubility parameter: 9.27): 68 parts Accordingly, the ratio of the conductive metal oxide with respect to the total solid content of the coating solution was 15 wt %.

Next, using the Micro Gravure coater (produced by Yasui Seiki), the hard coating layer-coating solution was applied to the first primer layer of the primer layer-attached transparent base in an environment with an absolute humidity of 10 g/m$^3$, and then dried. Subsequently, the dried coating was irradiated with ultraviolet rays in a dose of 100 mJ/cm$^2$, and thus the coating was cured, thereby forming a hard coating layer with a thickness of 3 μm. Subsequently, as in Example 1, a low refractive index layer and a near infrared absorption layer were formed, and thus an optical film for evaluation was manufactured.

Example 4

Preparation of Transparent Base

A primer layer-attached transparent base was prepared as in Example 1.

<Manufacture of Hard Coating Layer-Coating Solution>

A hard coating layer-coating solution was manufactured by sufficiently mixing and agitating the following materials in an environment with an absolute humidity of 14 g/m$^3$. The water content of the manufactured hard coating layer-coating solution was 0.71 wt % based on a measurement performed as in Example 1.
(1) Zinc antimonate fine particles (conductive metal oxide produced by Nissan Chemical Industries, Ltd., isopropyl alcohol sol with a solid content of 20 wt %, primary particle size: 20 nm): 10 parts (solid content: 2 parts)
(2) Pentaerythritol triacrylate: 8 parts (solid content)
(3) Dipentaerythritol hexaacrylate: 9 parts (solid content)
(4) Photoinitiator "IRGACURE (registered trademark) 907" (produced by Ciba Specialty Chemicals): 1 part (solid content)
(5) Methyl isobutyl ketone (solubility parameter: 8.57): 72 parts Accordingly, the ratio of the conductive metal oxide with respect to the total solid content of the coating solution was 10 wt %.

Next, using the Micro Gravure coater (produced by Yasui Seiki), the hard coating layer-coating solution was applied to the first primer layer of the primer layer-attached transparent base in an environment with an absolute humidity of 14 g/m$^3$, and then dried. Subsequently, the dried coating was irradiated with ultraviolet rays in a dose of 100 mJ/cm$^2$, and thus the coating was cured, thereby forming a hard coating layer with a thickness of 3 μm. Subsequently, as in Example 1, a low refractive index layer and a near infrared absorption layer were formed, and thus an optical film for evaluation was manufactured.

Comparative Example 1

An optical film for evaluation was manufactured as in Example 1, except that a hard coating layer-coating solution having the following composition was used. The water content of the used hard coating layer-coating solution was 0.43 wt % based on a measurement performed as in Example 1.
(1) Zinc antimonate fine particles (conductive metal oxide produced by Nissan Chemical Industries, Ltd., isopropyl alcohol sol with a solid content of 20 wt %, primary particle size: 20 nm): 3 parts (solid content: 0.6 parts)
(2) Pentaerythritol triacrylate: 9.2 parts (solid content)
(3) Dipentaerythritol hexaacrylate: 9.2 parts (solid content)
(4) Photoinitiator "IRGACURE (registered trademark) 184" (produced by Ciba Specialty Chemicals): 0.9 parts (solid content)
(5) Isopropyl alcohol (solubility parameter: 11.5): 77.7 parts Accordingly, the ratio of the conductive metal oxide with respect to the total solid content of the coating solution was 3 wt %.

Comparative Example 2

An optical film for evaluation was manufactured as in Example 1, except that a hard coating layer-coating solution having the following composition was used. The water content of the used hard coating layer-coating solution was 0.39 wt % based on a measurement performed as in Example 1.
(1) Zinc antimonate fine particles (conductive metal oxide produced by Nissan Chemical Industries, Ltd., isopropyl alcohol sol with a solid content of 20 wt %, primary particle size: 20 nm): 35 parts (solid content: 7 parts)
(2) Pentaerythritol triacrylate: 6 parts (solid content)
(3) Dipentaerythritol hexaacrylate: 7 parts (solid content)
(4) Photoinitiator "IRGACURE (registered trademark) 184" (produced by Ciba Specialty Chemicals): 0.5 parts (solid content)
(5) Isopropyl alcohol (solubility parameter: 11.5): 51.5 parts Accordingly, the ratio of the conductive metal oxide with respect to the total solid content of the coating solution was 34 wt %.

The following measurements were performed on the optical films in Examples 1 to 4 and Comparative Examples 1 and 2. The results are shown in Table 1 except for that of the transmission of near infrared rays.

<Content of Conductive Metal Oxide in Hard Coating Layer>

The ratio (wt %) of the conductive metal oxide with respect to the total solid content of the hard coating layer-coating solution was taken as the content (wt %) of the conductive metal oxide in the hard coating layer.

<Pencil Hardness>

The pencil hardness of the anti-reflection layer of the optical films was measured based on JIS K 5600. It should be noted that the low refractive index layer constituting the anti-reflection layer extremely is thinner than that of the hard coating layer, and thus the pencil hardness of the anti-reflection layer substantially refers to the pencil hardness of the hard coating layer.

<Total Light Transmission/Haze>

Using a spectrophotometer "Ubest V-570 type" (produced by JASCO Corporation), a measurement of the total light transmission and the haze of the optical films before providing the near infrared absorption layer was performed taking, as the side of incident light, a face opposite to a face provided with the hard coating layer of the transparent base.

<Surface Resistance>

Using a surface high-resistivity meter "HIRESTA HT-20" (produced by Mitsubishi Petrochemical Co., Ltd), a measurement of the surface resistance on the side of the low refractive index layer was performed on the optical films after providing the near infrared absorption layer.

<Transmission of Near Infrared Rays>

Using the above spectrophotometer, a measurement of the maximum value of the transmission in a wavelength region of near infrared rays of 850 to 1100 nm was performed on the optical films after providing the near infrared absorption layer, taking the side of the near infrared absorption layer as the side of incident light. As a result, the transmission of near infrared rays of all the optical films in Examples 1 to 4 and Comparative Examples 1 and 2 was 12% or less.

TABLE 1

|  | Ex. 1 | Ex. 2 | Ex. 3 | Ex. 4 | Com. Ex. 1 | Com. Ex. 2 |
| --- | --- | --- | --- | --- | --- | --- |
| content (wt %) of conductive metal oxide in hard coating layer | 25 | 17.5 | 15 | 10 | 3 | 34 |
| pencil hardness of anti-reflection layer | 2H | 2H | 2H | 2H | 2H | H |

TABLE 1-continued

|  |  | Ex. 1 | Ex. 2 | Ex. 3 | Ex. 4 | Com. Ex. 1 | Com. Ex. 2 |
|---|---|---|---|---|---|---|---|
| total light transmission (%) | PET | 92.4 | 92.4 | 92.4 | 92.4 | 92.4 | 92.4 |
|  | PET/anti-reflection layer | 92.8 | 93.1 | 93.5 | 93.9 | 94.4 | 88.5 |
| PET/haze of anti-reflection layer |  | 0.7 | 0.3 | 0.3 | 0.2 | 0.3 | 1.4 |
| surface resistance (Ω/square) |  | $2 \times 10^{10}$ | $4 \times 10^{11}$ | $3 \times 10^{12}$ | $6 \times 10^{12}$ | $10^{13}$ or more | $3 \times 10^{9}$ |

As clearly shown in Table 1, the optical films in Examples 1 to 4 have a lower surface resistance than that of the optical film in Comparative Example 1, and a higher total light transmission, a lower haze, and better transmittance and anti-static property than those of the optical film in Comparative Example 2. Furthermore, it is shown that the pencil hardness of the anti-reflection layer is 2 H in all the optical films in Examples 1 to 4, and thus a high scratch resistance is realized.

The present invention may be embodied in other forms without departing from the gist thereof. The embodiments disclosed in this application are to be considered in all respects as illustrative and not limiting. The scope of the present invention is indicated by the appended claims rather than by the foregoing description, and all changes which come within the meaning and range of equivalency of the claims are intended to be embraced therein.

What is claimed is:

1. An optical film, comprising:
   a transparent base; and
   an anti-reflection layer that is disposed on one main face of the transparent base,
   wherein the anti-reflection layer consists of a hard coating layer, and a low refractive index layer that is disposed on the hard coating layer in this order from the side of the transparent base,
   a thickness of the hard coating layer is 1 μm to 7 μm,
   the hard coating layer is formed using a resin containing an ionizing radiation setting resin,
   the hard coating layer contains a conductive metal oxide in an amount of at least 5 wt % and at most 30 wt % with respect to a total weight of the hard coating layer, wherein the conductive metal oxide is at least one selected from the group consisting of an antimony-tin oxide (ATO), an indium-tin oxide (ITO), a phosphorus-tin oxide (PTO), a zinc antimonite ($ZnSb_2O_6$), and an antimony pentoxide ($Sb_2O_5$),
   the hard coating layer is formed using a coating solution containing water in an amount of at least 0.3 wt % and at most 2.0 wt %, and
   a haze of the optical film is at most 0.8%.

2. The optical film according to claim 1, wherein a surface electrical resistance of the optical film on the side of the anti-reflection layer is at most $1 \times 10^{13}$ Ω/square.

3. The optical film according to claim 1, wherein a total light transmission of the optical film comprising the transparent base and the anti-reflection layer is at least 91%, and the total light transmission of the optical film is higher than that of the transparent base alone.

4. The optical film according to claim 1, wherein the hard coating layer contains the conductive metal oxide in an amount of at least 5 wt % and at most 20 wt % with respect to a total weight of the hard coating layer.

5. The optical film according to claim 1, wherein the hard coating layer contains the conductive metal oxide in an amount of at least 5 wt % and at most 15 wt % with respect to a total weight of the hard coating layer.

6. The optical film according to claim 1, wherein a primer layer further is disposed between the transparent base and the anti-reflection layer.

7. The optical film according to claim 1, wherein a near infrared absorption layer further is disposed on the other main face of the transparent base.

8. The optical film according to claim 7, wherein a primer layer further is disposed between the transparent base and the near infrared absorption layer.

9. The optical film according to claim 1, wherein the low refractive index layer further contains a binder.

10. A method for producing the optical film according to claim 1, comprising:
    preparing a hard coating layer-coating solution containing an ionizing radiation setting resin, a conductive metal oxide in an amount of at least 5 wt % and at most 30 wt % with respect to a total solid content of the coating solution, and water in an amount of at least 0.05 wt % and at most 5.0 wt % with respect to the coating solution;
    applying and drying the hard coating layer-coating solution on a surface of a transparent base; and
    forming a hard coating layer on the surface of the transparent base by curing the hard coating layer-coating solution.

11. The method for producing the optical film, according to claim 10, wherein the hard coating layer-coating solution is applied and dried to the surface of the transparent base in an atmosphere with an absolute humidity of at least 10 g/m$^3$ and at most 16 g/m$^3$.

12. A method for producing the optical film according to claim 1, comprising:
    preparing a hard coating layer-coating solution containing an ionizing radiation setting resin, and a conductive metal oxide in an amount of at least 5 wt % and at most 30 wt % with respect to a total solid content of the coating solution, in an atmosphere with an absolute humidity of at least 10 g/m$^3$ and at most 16 g/m$^3$;
    applying and drying the hard coating layer-coating solution on a surface of a transparent base; and
    forming a hard coating layer on the surface of the transparent base by curing the hard coating layer-coating solution.

13. The method for producing the optical film, according to claim 12, wherein the hard coating layer-coating solution is applied and dried on the surface of the transparent base in an atmosphere with an absolute humidity of at least 10 g/m$^3$ and at most 16 g/m$^3$.

14. An optical film, comprising:
    a transparent base; and
    an anti-reflection layer that is disposed on one main face of the transparent base,
    wherein the anti-reflection layer consists of a hard coating layer, and a low refractive index layer that is disposed on the hard coating layer in this order from the side of the transparent base,
    a thickness of the hard coating layer is 1 μm to 7 μm, the hard coating layer is formed using a resin containing an ionizing radiation setting resin, the hard coating layer contains a conductive metal oxide in an amount of at least 5 wt % and at most 30 wt % with respect to a total weight of the hard coating layer, wherein the conductive metal oxide is at least one selected from the group consisting of an antimony-tin oxide (ATO), an indium-tin oxide (ITO), a phosphorus-tin oxide (PTO), a zinc antimonite ($ZnSb_2O_6$), and an antimony pentoxide ($Sb_2O_5$), a surface electrical resistance of the optical film on the side of the anti-reflection layer is at most $1 \times 10^{13}$ Ω/square, a total light transmission of the optical film comprising the transparent base and the anti-reflection layer is at least 91%, and the total light transmission of the optical film is higher than that of the transparent base alone, and a haze of the optical film is at most 0.8%.

15. The optical film according to claim 14, wherein the hard coating layer is formed using a coating solution containing water in an amount of at least 0.05 wt % and at most 5.0 wt %.

16. The optical film according to claim 14, wherein the hard coating layer contains the conductive metal oxide in an amount of at least 5 wt % and at most 20 wt % with respect to a total weight of the hard coating layer.

17. The optical film according to claim 14, wherein the hard coating layer contains the conductive metal oxide in an amount of at least 5 wt % and at most 15 wt % with respect to a total weight of the hard coating layer.

18. The optical film according to claim 14, wherein a primer layer further is disposed between the transparent base and the anti-reflection layer.

19. The optical film according to claim 14, wherein a near infrared absorption layer further is disposed on the other main face of the transparent base.

20. The optical film according to claim 19, wherein a primer layer further is disposed between the transparent base and the near infrared absorption layer.

21. The optical film according to claim 14, wherein the low refractive index layer further contains a binder.

* * * * *